United States Patent
Yoshioka et al.

(10) Patent No.: US 12,463,750 B2
(45) Date of Patent: Nov. 4, 2025

(54) TERMINAL AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 610 days.

(21) Appl. No.: 17/793,814

(22) PCT Filed: Feb. 6, 2020

(86) PCT No.: PCT/JP2020/004691
§ 371 (c)(1),
(2) Date: Dec. 5, 2022

(87) PCT Pub. No.: WO2021/157042
PCT Pub. Date: Aug. 12, 2021

(65) Prior Publication Data
US 2023/0246742 A1    Aug. 3, 2023

(51) Int. Cl.
*H04L 1/08* (2006.01)
*H04W 72/1268* (2023.01)

(52) U.S. Cl.
CPC .......... *H04L 1/08* (2013.01); *H04W 72/1268* (2013.01)

(58) Field of Classification Search
CPC .............. H04L 1/08; H04L 2001/0093; H04L 2001/0097; H04L 1/1854; H04W 72/1268
See application file for complete search history.

(56) References Cited

U.S. PATENT DOCUMENTS

| 10,341,006 B2 * | 7/2019 | Ijaz ................... H04B 7/15528 |
| 11,647,503 B2 * | 5/2023 | Zhao ................... H04L 1/1861 |
|  |  | 370/329 |
| 2017/0188311 A1 | 6/2017 | Hwang et al. |
| 2019/0268063 A1 * | 8/2019 | Ijaz ..................... H04L 1/1887 |
| 2021/0160890 A1 * | 5/2021 | Selvanesan ........... H04W 72/56 |
| 2021/0227504 A1 * | 7/2021 | Hosseini ............. H04W 72/23 |
| 2021/0377871 A1 * | 12/2021 | Zhao ................... H04W 52/242 |
| 2022/0060286 A1 * | 2/2022 | Yoshioka ............. H04L 1/1854 |

(Continued)

FOREIGN PATENT DOCUMENTS

CN   110311762 A   10/2019
EP    3149867 A2    4/2017

(Continued)

OTHER PUBLICATIONS

International Search Report issued in PCT/JP2020/004691 on Sep. 24, 2020 (4 pages).

(Continued)

*Primary Examiner* — Abdullahi Ahmed
(74) *Attorney, Agent, or Firm* — Osha Bergman Watanabe & Burton LLP

(57) ABSTRACT

A terminal includes a reception unit that receives a response associated with retransmission control from another terminal via a first channel, a transmission unit that transmits the response associated with retransmission control to a base station via a second channel, and a control unit that determines a timing of transmitting the second channel based on a predetermined time configured between the first channel and the second channel.

4 Claims, 13 Drawing Sheets

(56) References Cited

U.S. PATENT DOCUMENTS

| | | | |
|---|---|---|---|
| 2022/0140958 A1 | 5/2022 | Zhou et al. | |
| 2023/0246744 A1* | 8/2023 | Yoshioka | H04L 1/1671 370/328 |

FOREIGN PATENT DOCUMENTS

| | | | |
|---|---|---|---|
| JP | 2017-516362 A | 6/2017 | |
| WO | 2015180890 A2 | 12/2015 | |
| WO | 2015180890 A3 | 2/2016 | |

OTHER PUBLICATIONS

Written Opinion of the International Searching Authority issued in PCT/JP2020/004691 on Sep. 24, 2020 (4 pages).

Samsung; "On Resource Allocation for NR V2X Mode 1"; 3GPP TSG RAN WG1 #99, R1-1912459; Reno, USA; Nov. 18-22, 2019 (10 pages).

NTT DOCOMO, Inc.; "Sidelink resource allocation mechanism mode 1 for NR V2X"; 3GPP TSG RAN WG1 #99, R1-1912881; Reno, US; Nov. 18-22, 2019 (15 pages).

NEC; "Mode 1 resource allocation mechanism for NR sidelink"; 3GPP TSG RAN WG1 #99, R1-1912616; Reno, USA; Nov. 18-22, 2019 (7 pages).

Huawei, HiSilicon; "Sidelink resource allocation mode 1"; 3GPP TSG RAN WG1 Meeting #99, R1-1911883; Reno, USA; Nov. 18-22, 2019 (24 pages).

3GPP TR 22.886 V15.1.0; "3rd Generation Partnership Project; Technical Specification Group Services and System Aspects; Study on enhancement of 3GPP Support for 5G V2X Services (Release 15)"; Mar. 2017 (58 pages).

3GPP TS 36.211 V15.7.0; "3rd Generation Partnership Project; Technical Specification Group Radio Access Network; Evolved Universal Terrestrial Radio Access (E-UTRA); Physical channels and modulation (Release 15)"; Sep. 2019 (239 pages).

Extended European Search Report issued in European Application No. 20917996.9, mailed on Jun. 23, 2023 (12 pages).

3GPP TSG RAN WG2 Meeting #68; R2-096893; "FDD Relay Type I Backhaul interference and HARQ issues;" InterDigital, Nov. 9-13, 2009, Jeju, Korea (18 pages).

Office Action issued in counterpart Japanese Patent Application No. 2021-575542 mailed on Jan. 9, 2024 (6 pages).

Office Action issued in Chinese Patent Application No. 202080094929.9, dated Feb. 12, 2025 (18 pages).

* cited by examiner

TERMINAL AND COMMUNICATION METHOD

TECHNICAL FIELD

The present invention relates to a terminal and a communication method in a radio communication system.

BACKGROUND ART

In LTE (Long Term Evolution) and a successor system of the LTE (for example, LTE-A (LTE-Advanced) and NR (New Radio) (which is also referred to as 5G)), D2D (Device to Device) techniques where terminals conduct direct communication with each other without involving a base station are considered (for example, non-patent document 1).

The D2D reduces traffic between terminals and base stations and even if the base stations fail to perform communications such as in the event of disasters, the D2D enables communication between the terminals. Note that although the D2D is referred to as "sidelink" in 3GPP ($3^{rd}$ Generation Partnership Project), the D2D is used as a more generic terminology in the present specification. However, the sidelink may be used in descriptions of embodiments as stated below if necessary.

The D2D communication is broadly divided into: D2D discovery for discovering other terminals capable of communication; and D2D communication (also referred to as direct communication between terminals or the like) for direct communication between terminals. In the following, when the D2D communication, the D2D discovery, and the like are not particularly distinguished, they are simply referred to as D2D. Also, signals transmitted and received in the D2D are referred to as D2D signals. Various use cases of services associated with V2X (Vehicle to Everything) in the NR are being discussed (for example, non-patent document 2).

PRIOR ART DOCUMENT

Non-Patent Document

[Non-Patent Document 1] 3GPP TS 36.211 V15.7.0 (2019 September)
[Non-Patent Document 2] 3GPP TR 22.886 V15.1.0 (2017 March)

SUMMARY OF INVENTION

Problem to be Solved by the Invention

In the inter-terminal direct communication in the NR-V2X, an operation of reporting a sidelink HARQ (Hybrid Automatic Repeat Request) response to a base station is supported. The number of slots in a Uu (The Radio Interface between UTRAN and the User Equipment) starting from a PSFCH (Physical Sidelink Feedback Channel) where a sidelink HARQ response is transmitted and received is reported to a terminal, and the timing of a PUCCH (Physical Uplink Control Channel) for transmitting the HARQ response is determined.

However, because processing time for reporting the sidelink HARQ response to the base station is not specified, all the terminals must perform reporting operations at any report timing indicated by the base station, and there is a risk that nonrealistic indications may occur from the standpoint of terminal cost.

In the light of the above problem, the present invention aims to enable a base station to indicate uplink transmission timing of a HARQ (Hybrid Automatic Repeat Request) response in inter-terminal direct communication as a value resulting from consideration of the processing time of a terminal.

Means for Solving the Problem

According to a technique disclosed herein, there is provided a terminal, comprising: a reception unit that receives a response associated with retransmission control from another terminal via a first channel; a transmission unit that transmits the response associated with retransmission control to a base station via a second channel; and a control unit that determines a timing of transmitting the second channel based on a predetermined time configured between the first channel and the second channel.

Advantage of the Invention

According to the disclosed technique, it is possible to enable a base station to indicate uplink transmission timing of a HARQ (Hybrid Automatic Repeat Request) response in inter-terminal direct communication as a value resulting from consideration of the processing time of a terminal.

EMBODIMENTS OF THE INVENTION

Hereinafter, embodiments of the present invention will be described with reference to the drawings. The embodiments described below are merely examples, and embodiments to which the present invention is applied are not limited to the following embodiments.

In operations of a radio communication system of an embodiment of the present invention, conventional techniques are used as needed. Note that the conventional techniques are conventional LTE, for example, but are not limited to the conventional LTE. Also, unless specifically stated otherwise, it should be appreciated that the terminology "LTE" used herein has a broader meaning including LIE-Advanced, its subsequent schemes (e.g., NR) or a wireless LAN (Local Area Network).

Also, in embodiments of the present invention, a duplex scheme may be TDD (Time Division Duplex) scheme, FDD (Frequency Division Duplex) scheme or other schemes (e.g., flexible duplex scheme or the like).

Also, in embodiments of the present invention, "configuring" a radio parameter or the like may mean that a predetermined value is pre-configured or that a radio parameter indicated from the base station 10 or the terminal 20 is configured.

Figure 1:
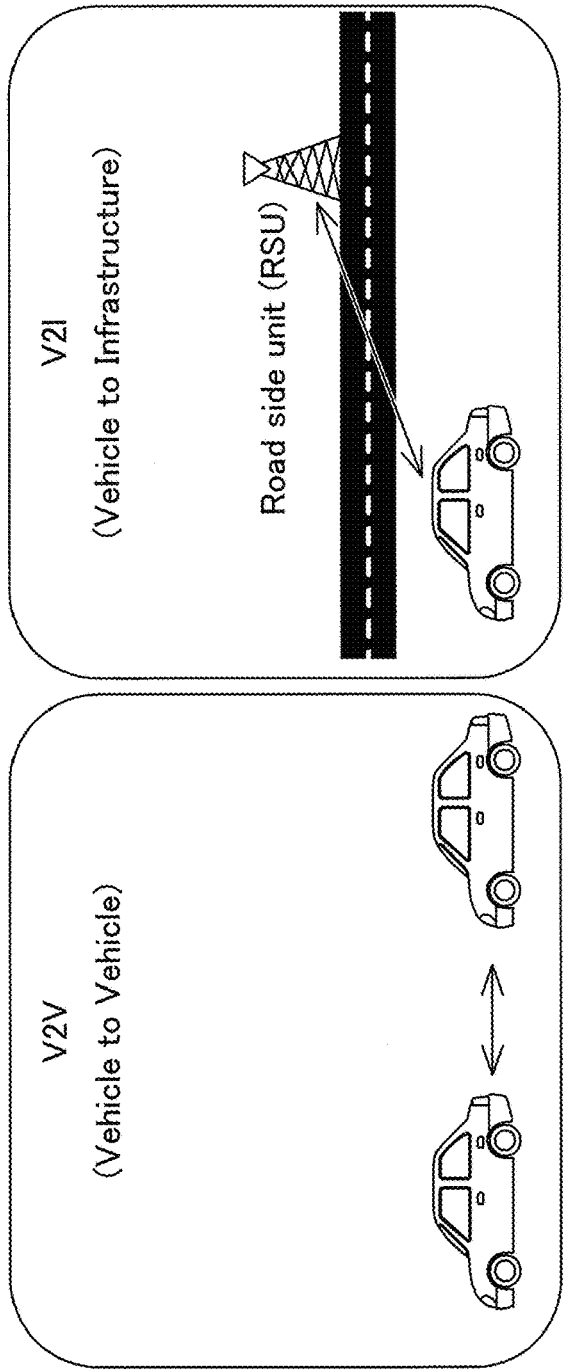
FIG. 1 is a diagram illustrating V2X.
Figure 1:
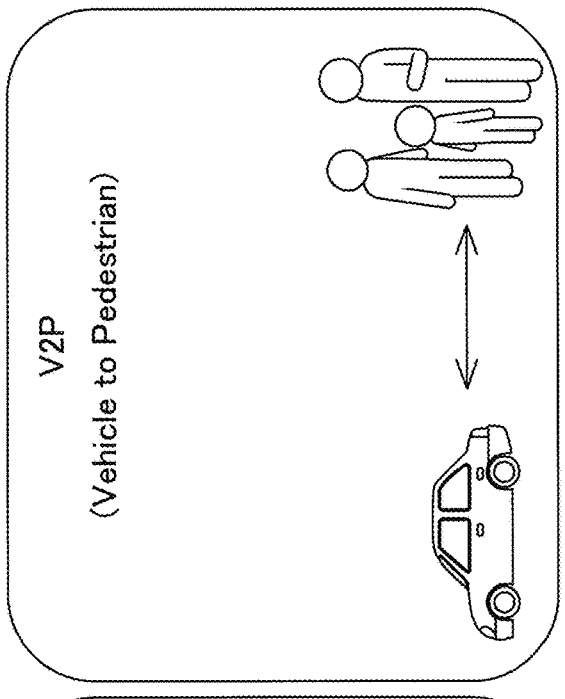
Figure 1:
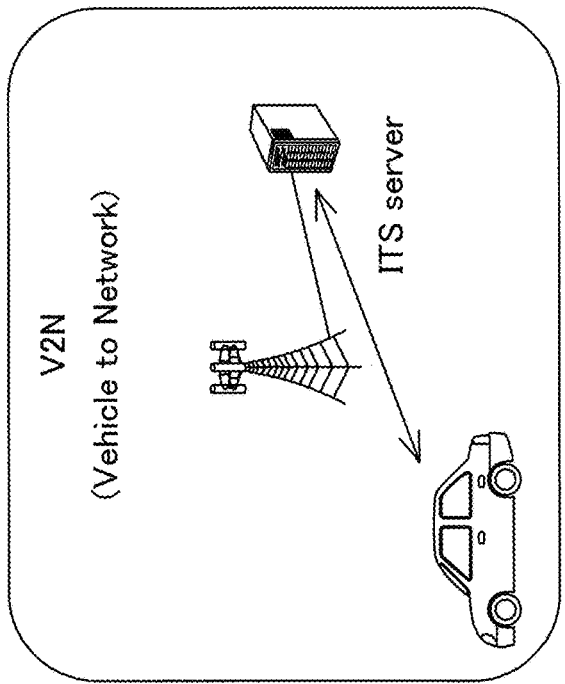

FIG. 1 is a diagram illustrating V2X. In 3GPP, it is considered that V2X (Vehicle to Everything) or eV2X (enhanced V2X) are implemented through enhancement of D2D functions, and the specification is promoted. As illustrated in FIG. 1, the V2X is a part of ITS (Intelligent Transport Systems) and is a collective term for V2V (Vehicle to Vehicle), which means the form of communication between vehicles, V2I (Vehicle to Infrastructure), which means the form of communication between a vehicle and a RSU (Road-Side Unit) located at a roadside, V2N (Vehicle to Network), which means the form of communication between a vehicle and an ITS server, and V2P (Vehicle to Pedestrian), which means the form of communication between a vehicle and a mobile terminal carried by a pedestrian.

Also, V2X utilizing cellular communication and inter-terminal communication of LTE or NR is considered in the 3GPP. The V2X utilizing cellular communication may be referred to as cellular V2X. In the V2X of the NR, implementations of large capacity, low delay, high reliability and QoS (Quality of Service) control are considered.

It is envisaged that the V2X of LTE or NR is not limited to the 3GPP specification in the future. For example, it is envisaged that interoperability, cost reduction by implementation of an upper layer, combination or switching manner of multiple RATs (Radio Access Technology), regulatory compliance in respective countries, data acquisition, distribution, database management and use of V2X platforms of LTE or NR will be considered.

In embodiments of the present invention, implementations of a communication device equipped to a vehicle are mainly envisaged, the embodiments of the present invention are not limited to those embodiments. For example, the communication device may be a terminal held by a person, a device equipped to a drone or an aircraft, a base station, an RSU, a relay node, a terminal having scheduling capabilities and so on.

Note that a SL (Sidelink) may be differentiated based on an UL (Uplink) or a DL (Downlink) and any or combinations of 1) to 4) below. Also, the SL may be referred to as other names.

1) Resource arrangement of a time domain
2) Resource arrangement of a frequency domain
3) Synchronization signal for reference (including SLSS (Sidelink Synchronization Signal))
4) Reference signal for use in pathloss measurement for transmit power control Also, regarding OFDM (Orthogonal Frequency Division Multiplexing) of the SL or the UL, any of CP-OFDM (Cyclic-Prefix OFDM), DFT-S-OFDM (Discrete Fourier Transform-Spread-OFDM), OFDM without transform precoding or OFDM with transform precoding may be applied.

In the SL of the LTE, Mode 3 and Mode 4 regarding SL resource assignment to a terminal 20 are defined. In Mode 3, transmission resources are dynamically assigned by DCI (Downlink Control Information) transmitted from a base station 10 to the terminal 20. Also, SPS (Semi Persistent Scheduling) is also enabled in Mode 3. In Mode 4, the terminal 20 autonomously selects transmission resources from a resource pool.

Note that a slot according to an embodiment of the present invention may be replaced with a symbol, a mini-slot, a subframe, a radio frame or a TTI (Transmission Time Interval). Also, a cell according to an embodiment of the present invention may be replaced with a cell group, a carrier component, a BWP, a resource pool, a resource, a RAT (Radio Access Technology), a system (including a wireless LAN) or the like.

Figure 2:
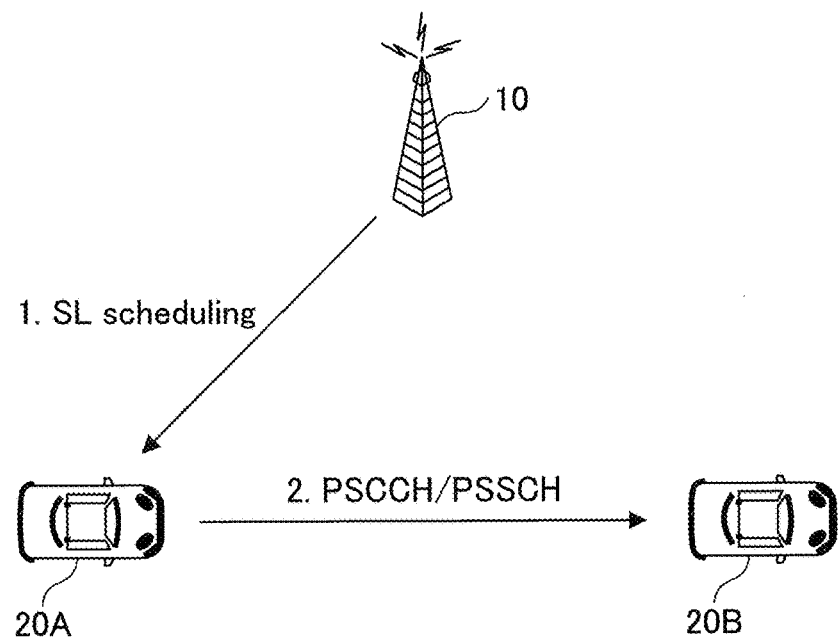
FIG. 2 is a diagram illustrating an example (1) of a transmission mode of the V2X.

FIG. 2 is a diagram illustrating example (1) of a transmission mode for the V2X. In the transmission mode for sidelink communication illustrated in FIG. 2, at step 1, the base station 10 transmits a scheduling for a sidelink to the terminal 20A. Then, the terminal 20A transmits a PSCCH (Physical Sidelink Control Channel) and a PSSCH (Physical Sidelink Shared Channel) to the terminal 20B based on the received scheduling (step 2). The transmission mode of the sidelink communication illustrated in FIG. 2 may be referred to as sidelink transmission mode 3 for the LTE. In the sidelink transmission mode 3 for the LTE, Uu based sidelink scheduling is performed. The Uu means a radio interface between a UTRAN (Universal Terrestrial Radio Access Network) and a UE (User Equipment). Note that the transmission mode for the sidelink communication illustrated in FIG. 2 may be referred to as sidelink transmission mode 1 for the NR.

Figure 3:
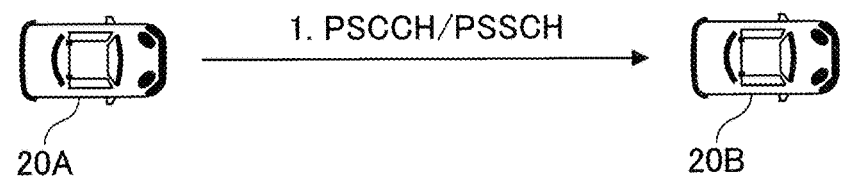
FIG. 3 is a diagram illustrating an example (2) of a transmission mode of the V2X.

FIG. 3 is a diagram illustrating example (2) of a transmission mode for the V2X. In the transmission mode for the sidelink communication illustrated in FIG. 3, at step 1, the terminal 20A uses autonomously selected resource to transmit a PSCCH and a PSSCH to the terminal 20B. The transmission mode for the sidelink communication illustrated in FIG. 3 may be referred to as sidelink transmission mode 4 for the LTE. In sidelink transmission mode 4 for the LTE, the UE itself perform resource selection.

Figure 4:
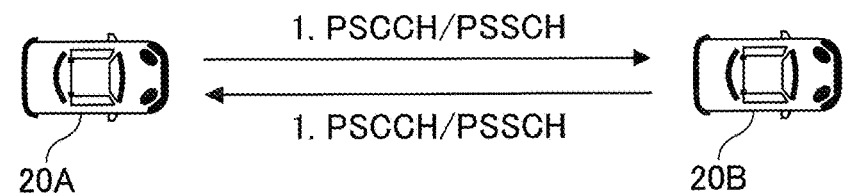
FIG. 4 is a diagram illustrating an example (3) of a transmission mode of the V2X.

FIG. 4 is a diagram illustrating example (3) of a transmission mode for the V2X. In a transmission mode for the sidelink communication illustrated in FIG. 4, at step 1, the terminal 20A uses an autonomously selected resource to transmit a PSCCH and a PSSCH to the terminal 20B. Analogously, the terminal 20B uses an autonomously selected resource to transmit a PSCCH and a PSSCH to the terminal 20A (step 1). The transmission mode for the sidelink communication illustrated in FIG. 4 may be referred to as sidelink transmission mode 2a for the NR. In the sidelink transmission mode 2 for the NR, the terminal 20 itself performs resource selection.

Figure 5:
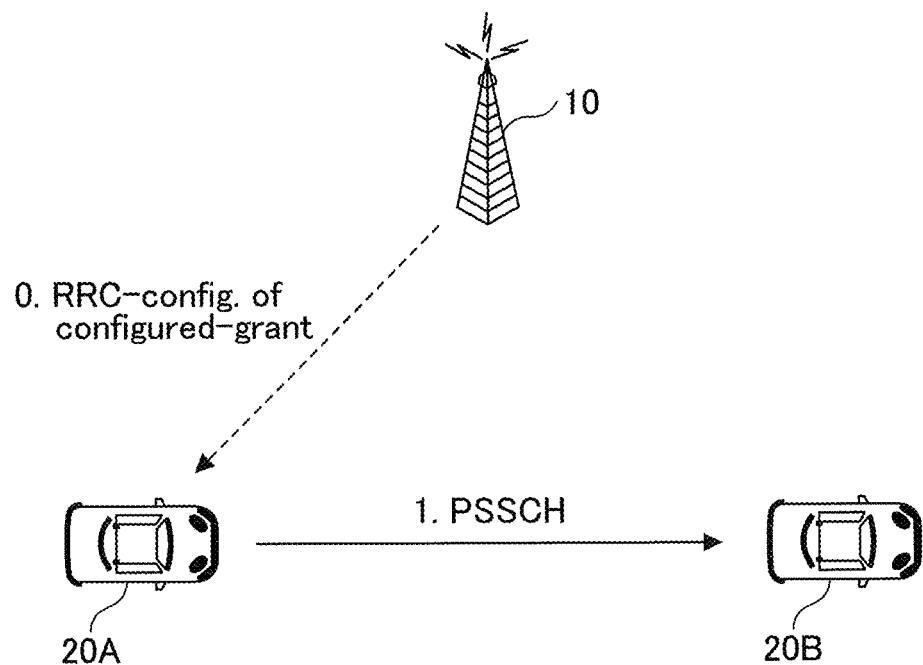
FIG. 5 is a diagram illustrating an example (4) of a transmission mode of the V2X.

FIG. 5 is a diagram illustrating example (4) of a transmission mode for the V2X. In the transmission mode for the sidelink communication illustrated in FIG. 5, at step 0, the base station 10 transmits a sidelink grant to the terminal 20A via an RRC (Radio Resource Control) configuration. Then, the terminal 20A transmits a PSSCH to the terminal 20B via received resource pattern (step 1). The transmission mode for the sidelink communication illustrated in FIG. 5 may be referred to as sidelink transmission mode 2c for the NR.

Figure 6:
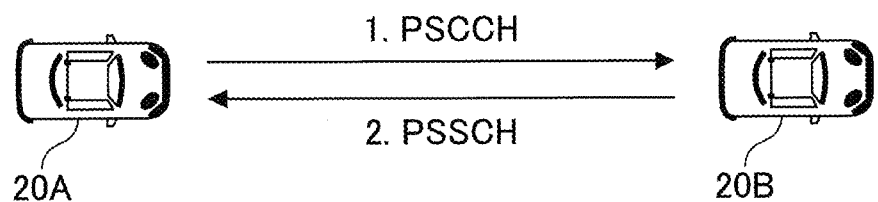
FIG. 6 is a diagram illustrating an example (5) of a transmission mode of the V2X.

FIG. 6 is a diagram illustrating example (5) of a transmission mode for the V2X. In a transmission mode for the sidelink communication illustrated in FIG. 6, at step 1, the terminal 20A transmits a sidelink scheduling to the terminal 20B via a PSCCH. Then, the terminal 20B transmits a PSSCH to the terminal 20A based on the received scheduling (step 2). The transmission mode for the sidelink communication illustrated in FIG. 6 may be referred to as sidelink transmission mode 2d for the NR.

Figure 7:
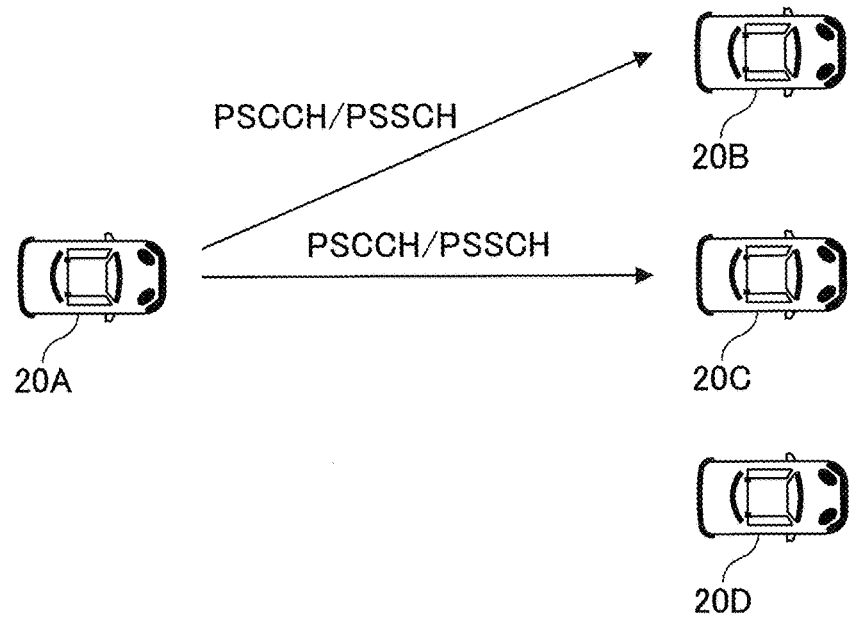
FIG. 7 is a diagram illustrating an example (1) of a communication type of the V2X.

FIG. 7 is a diagram illustrating example (1) of a communication type of the V2X. The sidelink communication type illustrated in FIG. 7 is a unicast. The terminal 20A transmits a PSCCH and a PSASCH to the terminal 20. In the example illustrated in FIG. 7, the terminal 20A performs unicast for the terminal 20B and also performs a unicast for the terminal 20C.

Figure 8:
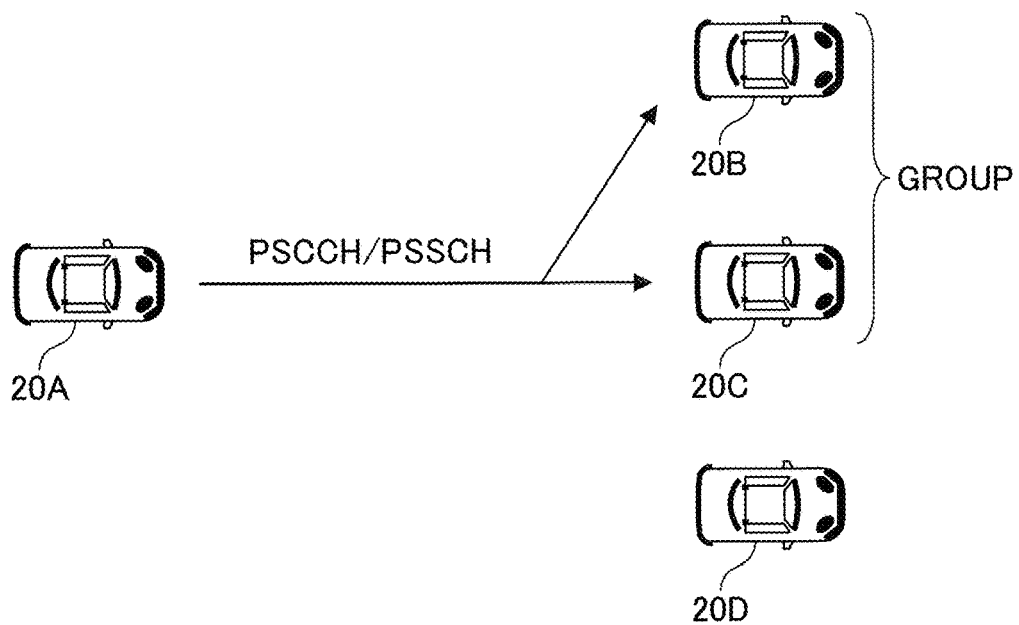
FIG. 8 is a diagram illustrating an example (2) of a communication type of the V2X.

FIG. 8 is a diagram illustrating example (2) of a communication type for the V2X. The sidelink communication type illustrated in FIG. 8 is a groupcast. The terminal 20A transmits a PSCCH and a PSSCH to a group to which one or more terminals 20 belong. In the example illustrated in FIG. 8, the group includes the terminals 20B and 20C, and the terminal 20A performs a groupcast to the group.

Figure 9:
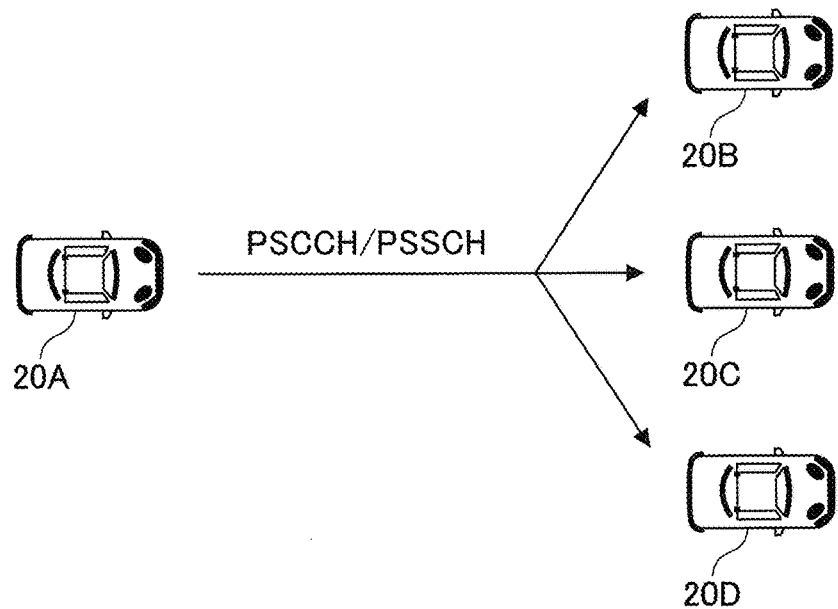
FIG. 9 is a diagram illustrating an example (3) of a communication type of the V2X.

FIG. 9 is a diagram illustrating example (3) of a communication type for the V2X. The sidelink communication type illustrated in FIG. 9 is a broadcast. The terminal 20A transmits a PSCCH and a PSSCH to one or more terminals 20. In the example illustrated in FIG. 9, the terminal 20A performs a broadcast to the terminals 20B, 20C and 20D. Note that the terminal 20A illustrated in FIGS. 7 to 9 may be referred to as a header UE.

Also, it is envisaged in NR-V2X that a HARQ (Hybrid Automatic Repeat Request) is supported for the sidelink unicast and groupcast. In addition, SFCI (Sidelink Feedback Control Information) including a HARQ response is defined in the NR-V2X. In addition, it is considered that the SFCI is transmitted via a PSFCH (Physical Sidelink Feedback Channel).

Although the PSFCH is used for sidelink transmission of a HARQ-ACK in descriptions below, it is merely one example. For example, a PSCCH may be used to transmit the sidelink HARQ-ACK, a PSSCH may be used to transmit the sidelink HARQ-ACK or other channels may be used to transmit the sidelink HARQ-ACK.

In the following, general information reported by the terminal 20 in HARQs is referred to as the HARQ-ACK for convenience. The HARQ-ACK may be referred to as HARQ-ACK information. Also, more specifically, a codebook applied to the HARQ-ACK information reported from the terminal 20 to the base station 10 or the like is referred to as a HARQ-ACK codebook. The HARQ-ACK codebook specifies bit sequences of the HARQ-ACK information. Note that not only a NACK but also the ACK is transmitted in the HARQ-ACK.

Figure 10:
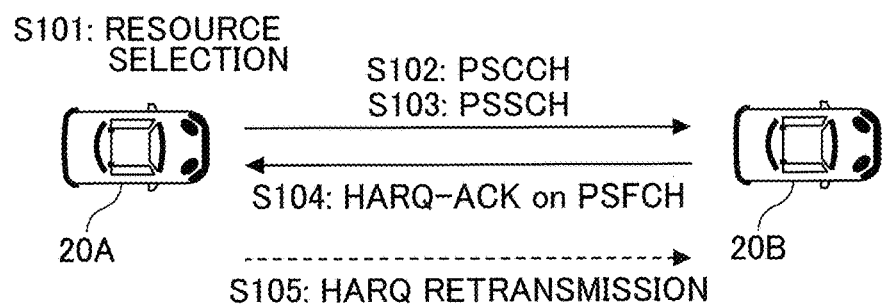
FIG. 10 is a sequence diagram illustrating an example (1) of operation of the V2X.

FIG. 10 is a diagram illustrating example (1) of arrangement and operation of a radio communication system according to an embodiment of the present invention. As illustrated in FIG. 10, the radio communication system according to an embodiment of the present invention has terminals 20A and 20B. Note that although a large number of user equipments are actually present, the terminals 20A and 20B are exemplarily illustrated in FIG. 10.

In the following, if the terminals 20A, 20B and so on are not particularly differentiated, they are simply described as "terminal 20" or "user equipment". Although the case where both the terminals 20A and 20B are within a coverage of a cell is illustrated in FIG. 10, the operation according to an embodiment of the present invention may be also applied to the case where the terminal 20B is out of the coverage. Also, the present embodiment is not limited to the terminal and the base station and may be a communication device.

As stated above, in the present embodiment, the terminal 20 is a device equipped to a vehicle such as a car, for example, and has cellular communication functions and sidelink functions as a UE in the LTE or the NR. The terminal 20 may be a general mobile terminal (such as a smartphone). Also, the terminal 20 may be a RSU. The RSU may be a UE type of RSU having UE functions or gNB type of RSU having functions of a base station apparatus.

Note that the terminal 20 is unnecessarily a device of a single housing and even if various sensors are distributed and installed in a vehicle, for example, the device including these sensors is the terminal 20.

Also, processing contents at the terminal 20 for sidelink transmission data are basically similar to those of UL transmission for the LTE or the NR. For example, the terminal 20 scrambles and modulates a codeword of transmission data to generate complex-valued symbols and maps the complex-valued symbols (transmission signal) to one or two layers for precoding. Then, the terminal 20 maps the precoded complex-valued symbols to a resource element to generate a transmission signal (for example, a complex-valued time-domain SC-FDMA signal) and transmits it from each antenna port.

Note that the base station 10 has cellular communication functions to serve as a base station for the LTE or the NR and functions capable of communicating with the terminal 20 according to the present embodiment (for example, resource pool configuration, resource assignment or the like). Also, the base station 10 may be an RSU (a gNB type of RSU).

Also, a signal waveform utilized by the terminal 20 in the SL or the UL in the radio communication system according to an embodiment of the present invention may be OFDMA, SC-FDMA or others.

At step S101, the terminal 20A autonomously selects a resource used for a PSCCH and a PSSCH from a resource selection window having a predetermined period. The resource selection window may be configured for the terminal 20 from the base station 10.

At steps S102 and S103, the terminal 20A uses the resource autonomously selected at step S101 to transmit SCI (Sidelink Control Information) in a PSCCH and SL data in a PSSCH. For example, the terminal 20A may use a frequency resource adjacent to a frequency resource of the PSSCH with the same time resource as a time resource of the PSSCH to transmit the SCI (PSCCH).

The terminal 20B receives the SCI (PSCCH) and the SL data (PSSCH) transmitted from the terminal 20A. The SCI received in the PSCCH may include information for a resource of a PSFCH for transmission of a HARQ-ACK for reply to reception of the data. The terminal 20A may include the information for the autonomously selected resource in the SCI for transmission.

At step S104, the terminal 20B uses the PSFCH resource indicated in the received SCI to transmit the HARQ-ACK for the received data to the terminal 20A.

At step S105, if the HARQ-ACK received at step S104 indicates a request for retransmission, that is, if it is a NACK (negative response), the terminal 20A retransmits the PSCCH and the PSSCH to the terminal 20B. The terminal 20A may use the autonomously selected resource to retransmit the PSCCH and the PSSCH.

Note that if the HARQ control is not performed, steps S104 and S105 may not be performed.

Figure 11:
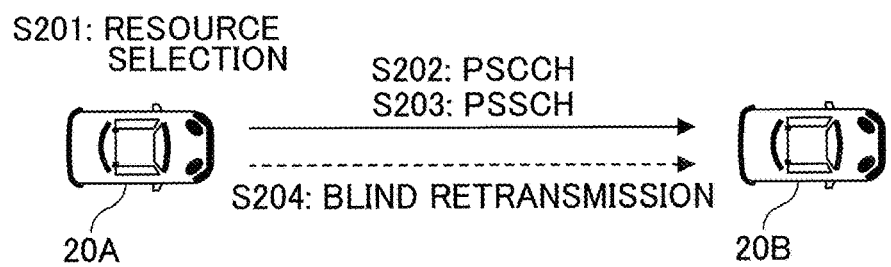
FIG. 11 is a sequence diagram illustrating an example (2) of operation of the V2X.

FIG. 11 is a diagram illustrating example (2) of arrangement and operation of the radio communication system according to an embodiment of the present invention. Blind retransmission that does not rely on the HARQ control may be performed so as to improve a success of transmission or a reachable distance.

At step S201, the terminal 20A autonomously selects a resource for use of a PSCCH and a PSSCH from a resource selection window having a predetermined period. The resource selection window may be configured for the terminal 20 from the base station 10.

At steps S202 and S203, the terminal 20A uses the resource autonomously selected at step S201 to transmit SCI with the PSCCH and SL data with the PSSCH. For example, the terminal 20A may use a frequency resource adjacent to a frequency resource of the PSSCH in the same time resource as a time resource of the PSSCH to transmit the SCI (PSCCH).

At step S204, the terminal 20A uses the resource autonomously selected at step S201 to retransmit the SCI in the PSCCH and the SL data in the PSSCH to the terminal 20B. The retransmission at step S204 may be performed multiple times.

Note that if the blind retransmission is not performed, step S204 may not be performed.

Figure 12:
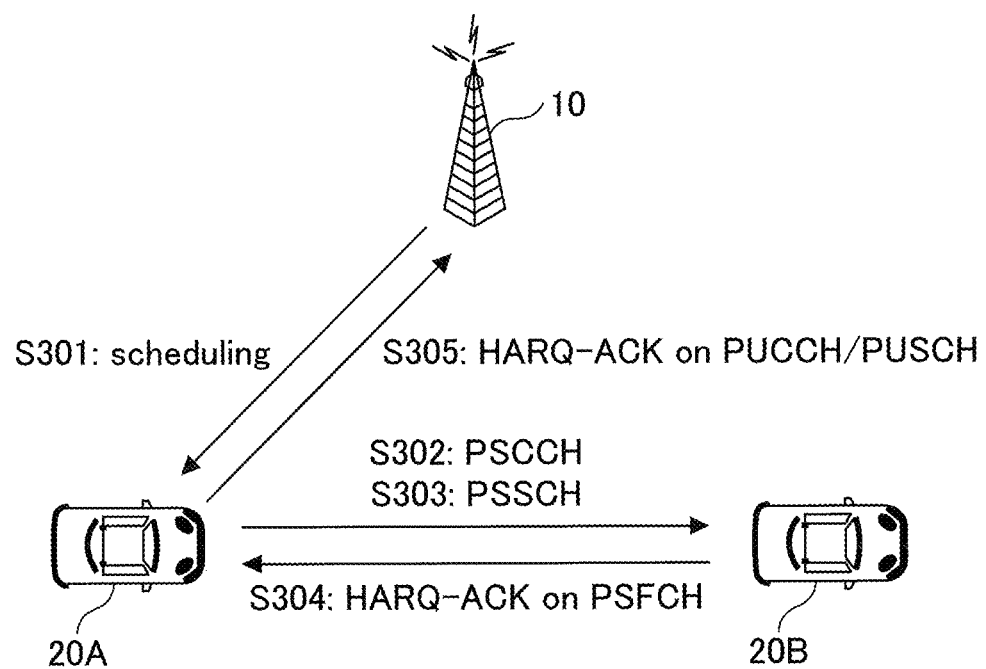
FIG. 12 is a sequence diagram illustrating an example (3) of operation of the V2X.

FIG. 12 is a diagram illustrating example (3) of arrangement and operation of the radio communication system according to an embodiment of the present invention. The base station 10 may perform a scheduling for sidelink. Namely, the base station 10 may determine a resource for sidelink for use of the terminal 20 and transmit information indicative of the resource to the terminal 20. In addition, if the HARQ control is applied, the base station 10 may transmit information indicative of at least one of a PSFCH resource and a PUCCH resource to the terminal 20.

At step S301, the base station 10 performs an SL scheduling for the terminal 20A by transmitting DCI (Downlink Control Information) in a PDCCH. Hereinafter, for convenience, the DCI for the SL scheduling is referred to as SL scheduling DCI.

Also, at step S301, it is envisaged that the base station 10 also transmits the DCI for a DL scheduling (may be referred to as DL assignment) in the PDCCH. Hereinafter, for convenience, the DCI for the DL scheduling is referred to as DL scheduling DCI. Upon receiving the DL scheduling DCI, the terminal 20A uses a resource indicated in the DL scheduling DCI to receive DL data in a PDSCH.

At steps S302 and S303, the terminal 20A uses a resource indicated in the SL scheduling DCI to transmit SCI (Sidelink Control Information) in a PSCCH and SL data in a PSSCH. Note that only a resource of the PSSCH may be indicated in the SL scheduling DCI. In this case, for example, the terminal 20A may use a frequency resource adjacent to a frequency resource of the PSSCH in the same time resource as a time resource of the PSSCH to transmit the SCI (PSCCH). Note that the SCI may be transmitted in at least one of a PSCCH and a PSSCH.

The terminal 20B receives the SCI (PSCCH) and the SL data (PSSCH) transmitted from the terminal 20A. The SCI received in the PSCCH may include information regarding a resource of a PSFCH for transmitting a HARQ-ACK for reception of the data from the terminal 20B.

The information regarding the resource is included in the DL scheduling DCI or the SL scheduling DCI transmitted from the base station 10 at step S301, and the terminal 20A may acquire the information regarding the resource from the DL scheduling DCI or the SL scheduling DCI and it may include the SCI. Alternatively, the information regarding the resource may not be included in the DCI transmitted from the base station 10, and the terminal 20A may autonomously include the information regarding the resource in the SCI for transmission.

At step S304, the terminal 20B uses a resource of the PSFCH indicated in the received SCI to transmit a HARQ-ACK for the received data to the terminal 20A.

At step S305, the terminal 20A transmits the HARQ-ACK at a timing (for example, a timing in unit of slot) indicated in the DL scheduling DCI (or the SL scheduling DCI) with use of a PUCCH (Physical Uplink Control Channel) resource indicated in the DL scheduling DCI (or the SL scheduling DCI), and the base station 10 receives the HARQ-ACK. A codebook of the HARQ-ACK may include the sidelink HARQ-ACK and the HARQ-ACK for DL data. Note that the HARQ-ACK for the DL data may not be included in the case where no DL data is assigned or the like.

Note that the sidelink HARQ-ACK and the HARQ-ACK for DL data are not included in the same HARQ-ACK codebook in NR Rel-16. Also, the "sidelink HARQ-ACK" may mean an HARQ-ACK corresponding to a sidelink channel and/or resource. More specifically, for example, the base station 10 performs scheduling for the terminal 20A, and the terminal 20A transmits a transport block to the terminal 20B in a PSCCH/PSSCH. The terminal 20B performs feedback for the terminal 20A for transmission of the transport block in the PSCCH/PSSCH and based on the feedback, the terminal 20A provides a feedback to the base station 10 in the HARQ-ACK. For example, the terminal 20A may relay an HARQ-ACK ((ACK: acknowledgement) or (NACK: negative-acknowledgement)) received from the terminal 20B to the base station 10.

Note that if HARQ control is not performed, steps S304 and S305 may not be performed.

Figure 13:
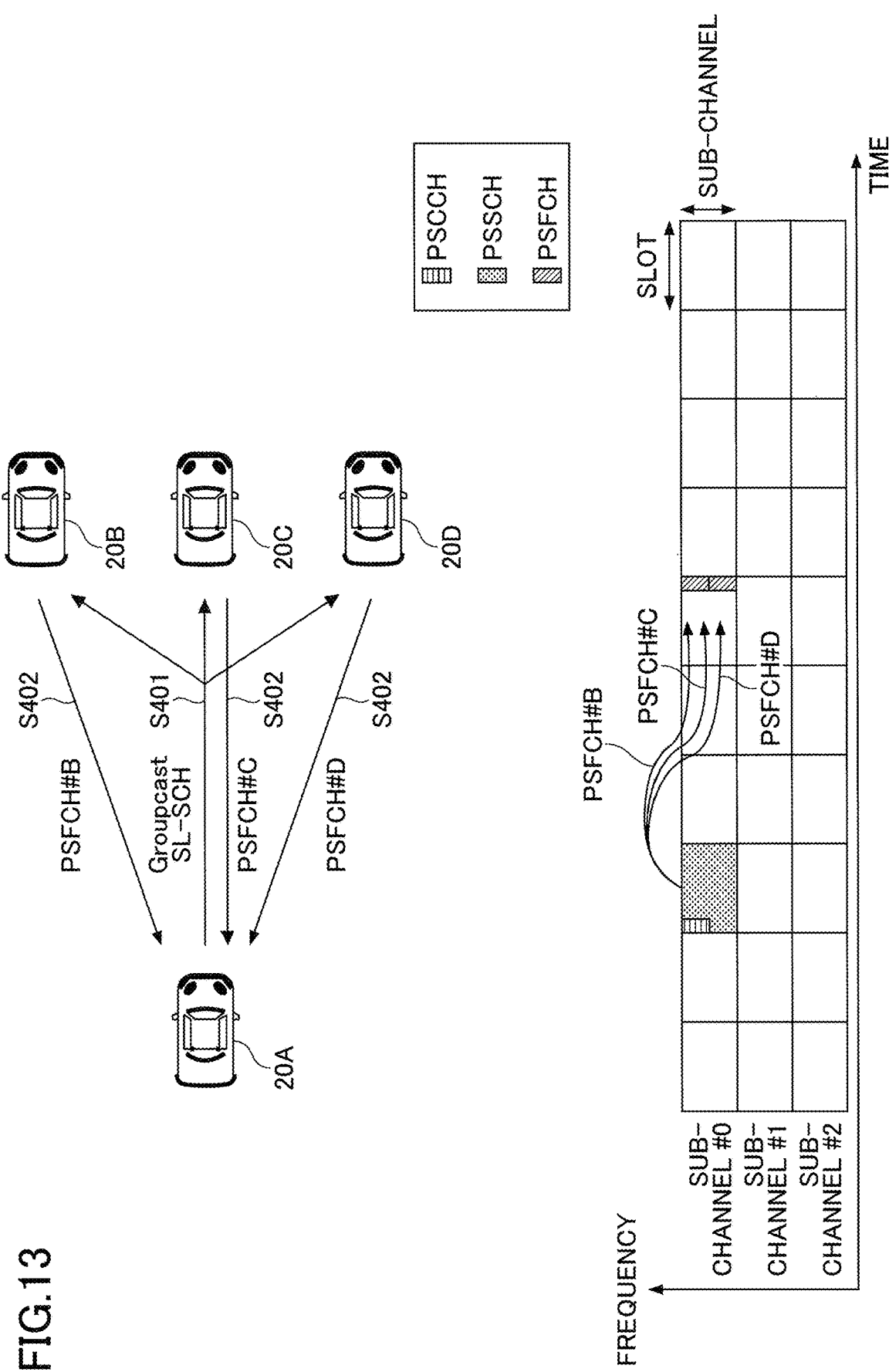
FIG. 13 is a sequence diagram illustrating an example (4) of operation of the V2X.

FIG. 13 is a diagram illustrating an example (4) of operation according to an embodiment of the present invention. As stated above, transmission of the HARQ response in the PSFCH is supported in the NR sidelink. Note that a format similar to PUCCH (Physical Uplink Control Channel) format 0 is available as the PSFCH format. In other words, in the PSFCH format, the PRB (Physical Resource Block) size is equal to 1, and the ACK and the NACK may be a sequence based format that can be differentiated based on differences of sequences. The PSFCH format is not limited to the above. A resource of the PSFCH may be placed at last one or more symbols of a slot or one or more symbols other than the last one of the slot. Also, it may be preconfigured to the PSFCH resource whether cycle N is configured. It may be preconfigured whether the cycle N is configured in unit of slot.

In FIG. 13, the vertical axis corresponds to a frequency domain, and the horizontal axis corresponds to a time domain. The PSCCH may be placed at first one or more symbols of a slot or at one or more symbols other than the first symbol of the slot. The PSFCH may be placed at last one or more symbols of a slot or at one or more symbols other than the last slot. In the example illustrated in FIG. 13, three sub-channels are configured in a resource pool, and the two PSFCHs are placed in the third slot from the slot where the PSSCH is placed. The arrow from the PSSCH to the PSFCH shows an example of the PSFCH associated with the PSSCH.

If the HARQ response in NR-V2X groupcast is option 2 of transmitting the ACK or NACK, a resource for use in transmission and reception of the PSFCH is required to be determined. As illustrated in FIG. 13, at step S401, the terminal 20A serving as the transmitting terminal 20 performs groupcast on the terminals 20B, 20C, and 20D serving as the receiving terminal 20 via an SL-SCH. Then, at step S402, the terminals 20B, 20C, and 20D use a PSFCH #B, a PSFCH #C, and a PSFCH #D, respectively, to transmit the HARQ responses to the terminal 20A. Here, as illustrated in the example in FIG. 13, if the number of available PSFCH resources is smaller than the number of receiving terminals 20 belonging to a group, it must be determined how to assign the PSFCH resources. Note that the transmitting terminal 20 may obtain the number of receiving terminals 20 in the groupcast.

Figure 14:
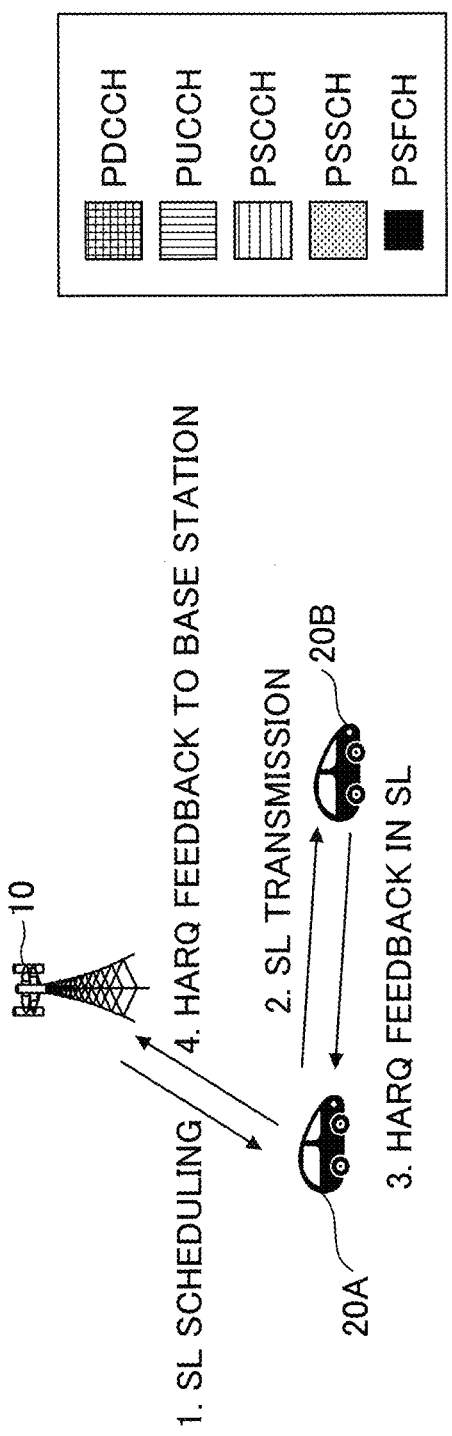
FIG. 14 is a diagram illustrating an example (1) of HARQ response according to an embodiment of the present invention.
Figure 14:
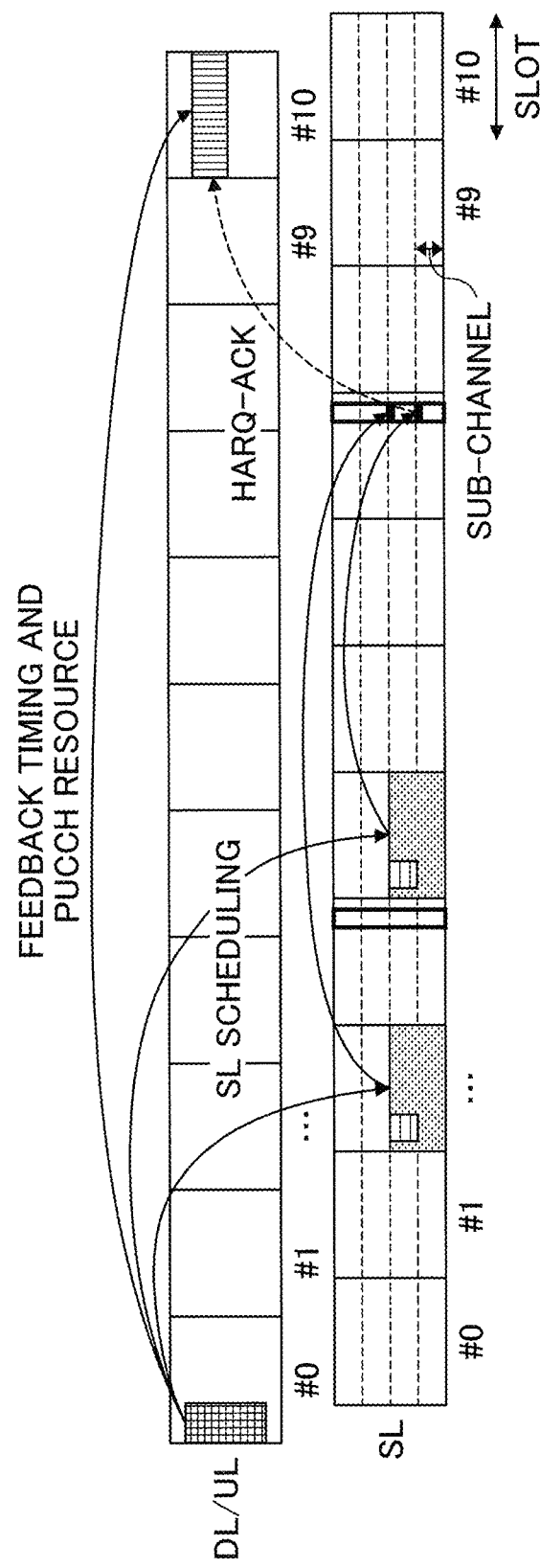

FIG. 14 is a diagram illustrating an example (1) of HARQ response according to an embodiment of the present invention. As illustrated in step 4 in FIG. 14, an operation of reporting an HARQ response in SL to the base station 10 is supported. In RA (Resource Allocation) mode 1 where the base station 10 performs SL scheduling as illustrated in FIG. 14, an SL-HARQ-ACK is fed back to the base station 10. Note that the embodiment of the present invention is not limited to RA mode 1 and may include cases where the base station 10 controls at least one of sidelink transmission and sidelink reception of the terminal 20. A DL/UL carrier illustrated in FIG. 14 may be referred to as a Uu carrier. Although the SL carrier illustrated in FIG. 14 is composed of four subchannels, the number of subchannels may be more or less than 4.

In slot #0 for DL/UL, the base station 10 transmits an SL scheduling to the terminal 20A via a PDCCH. Then, the terminal 20A performs SL transmission to the terminal 20B in slots #2 and #4 for SL via a PSCCH and a PSSCH. Then, the terminal 20B transmits an SL HARQ feedback to the terminal 20A in slot #7 for SL via a PSFCH. Then, the terminal 20A transmits an HARQ feedback to the base station 10 in slot #10 for DL/UL via a PUCCH.

Figure 15:
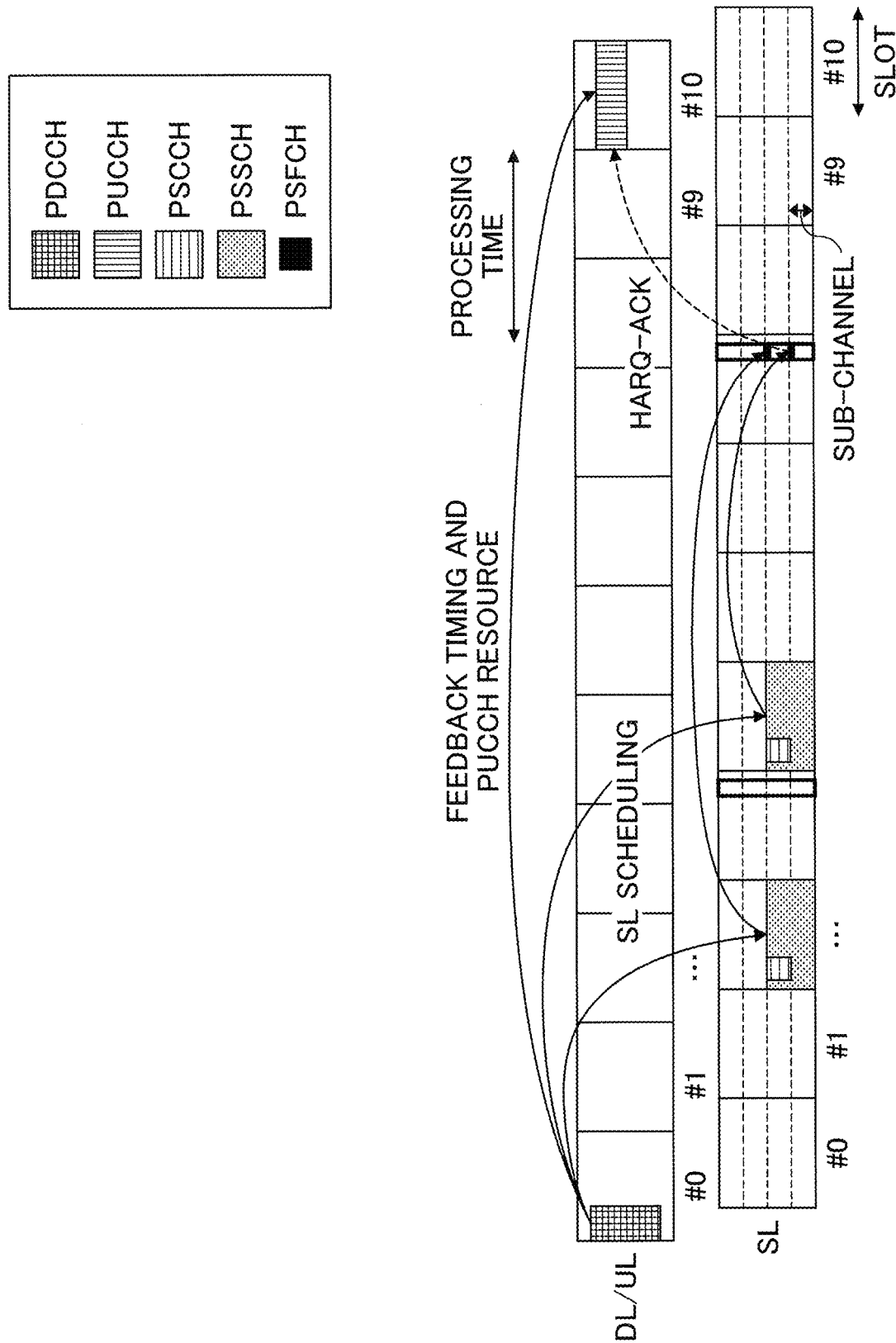
FIG. 15 is a diagram illustrating an example (2) of HARQ response according to an embodiment of the present invention.

However, the processing time for transmitting the SL HARQ feedback to the base station 10 at the terminal 20 is not specified. FIG. 15 is a diagram illustrating an example (2) of HARQ response according to an embodiment of the present invention. As illustrated in the processing time in FIG. 15, the time required by the terminal 20 from a PSFCH reception occasion to a PUCCH (or a PUSCH) is not specified.

In the case where the processing time of the terminal 20 for transmitting the SL HARQ feedback to the terminal 20 is not specified, the terminal 20 is required to perform the transmission of the SL HARQ feedback to the base station 10 even in a case in which the time from the PSFCH reception occasion to a PUCCH (or a PUSCH) is very short. However, this requirement is not realistic in view of terminal cost. Also, in the case where the processing time at the terminal 20 for transmitting the SL HARQ feedback to the base station 10 is specified, it is unclear as to which timing is a reference point and how long the processing time is. Also, with respect to the processing time, the timing misalignment between a Uu carrier and an SL carrier must be taken into account.

The PSFCH processing time may be defined as stated below. Note that the PSFCH processing time may be referred to as different names, or the PSFCH processing time may be implicitly specified by the earliest feedback timing that can be indicated by the base station 10 and that is greater than a specific value (for example, one).

Figure 16:
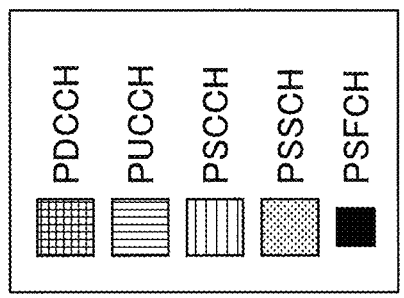
FIG. 16 is a diagram illustrating an example (3) of HARQ response according to an embodiment of the present invention.
Figure 16:
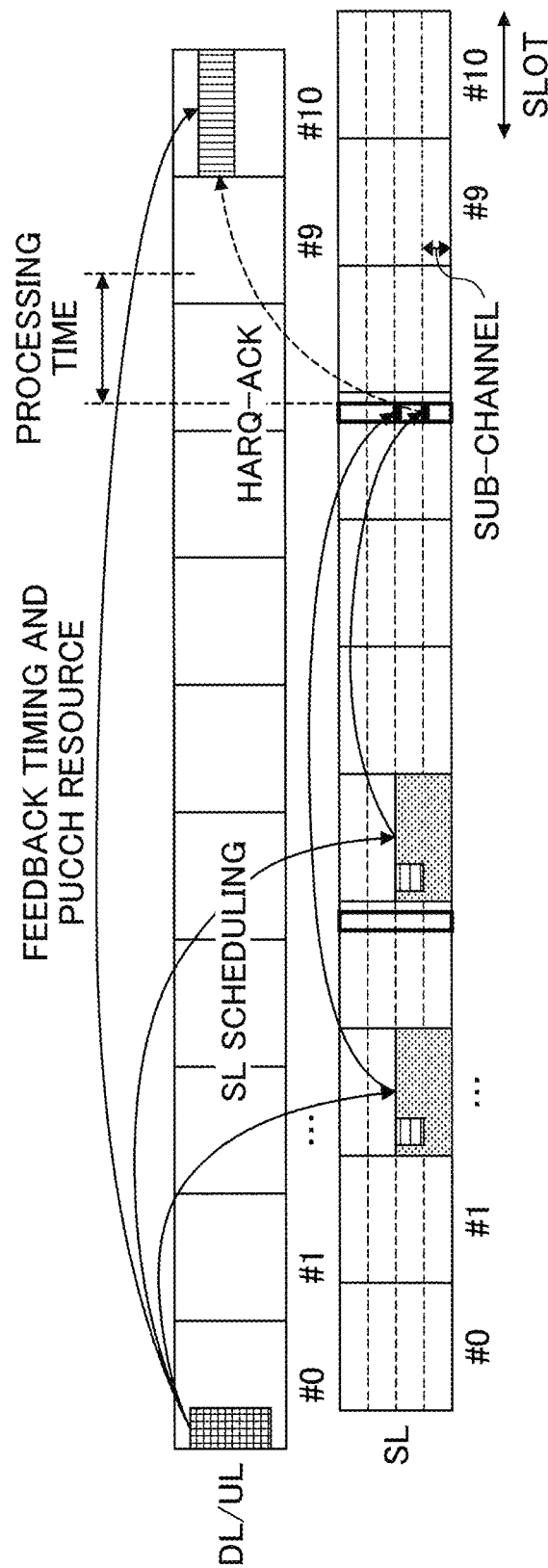

FIG. 16 is a diagram illustrating an example (3) of HARQ response according to an embodiment of the present invention. As illustrated in FIG. 16, the PSFCH processing time may be: the time required for operations at the terminal 20 after reception of the PSFCH; or the time that ends at the time point at which a PUCCH is ready to be transmitted.

For example, the value of the PSFCH processing time may be limited with respect to a time gap based on at least one of 1) to 3) below. Hereinafter, "the timing" may be "a starting timing (starting time)", "a middle timing (middle time)" or "an ending timing (ending time)" and is not limited to them. The "middle timing" may mean a time point of elapsing of a half of a channel period. Note that "the PSFCH timing" hereinafter may include one gap symbol after the PSFCH.

1) PSFCH timing
2) timing of an UL feedback channel (a PUCCH or a PUSCH)
3) specific offset based on timings of a Uu carrier and an SL carrier For example, the PSFCH processing time may be defined as time from the timing of the PSFCH reception occasion. The timing of the corresponding UL feedback channel may be indicated or configured after the time point after elapsing of the PSFCH processing time.

By defining the PSFCH processing time as stated above, the base station 10 can perform scheduling by taking into account the time required for processing the PSFCH and preparing the PUCCH.

Figure 17:
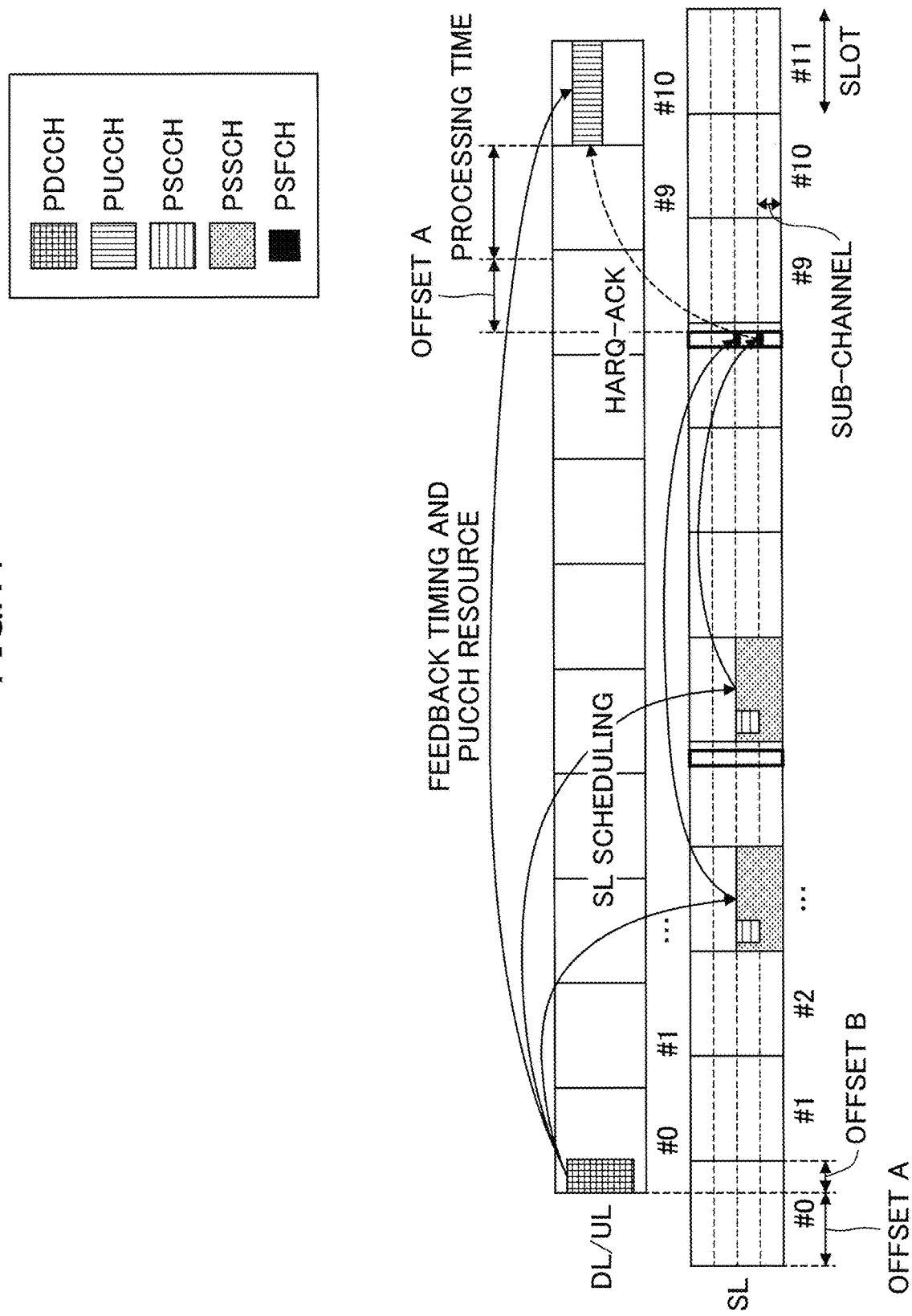
FIG. 17 is a diagram illustrating an example (4) of HARQ response according to an embodiment of the present invention.

FIG. 17 is a diagram illustrating an example (3) of HARQ response according to an embodiment of the present invention. As illustrated in FIG. 17, the PSFCH processing time may be defined as a period that starts from a time point after a specific offset or after a time based on the specific offset, from the timing of the PSFCH reception occasion, the specific offset being based on a timing difference between a Uu carrier and an SL carrier. The timing of the corresponding UL feedback channel may be indicated or configured after a time point after elapsing of the PSFCH processing time.

As illustrated in FIG. 17, the specific offset or the time based on the specific offset may be: offset A between an SL carrier and a Uu carrier; offset B between an SL transmission timing scheduled for the case of offset A=0 and an SL transmission timing actually scheduled; or the maximum value of offset A and offset B.

By defining the PSFCH processing time as stated above, the base station 10 can perform scheduling by taking into account the time required for processing the PSFCH and preparing the PUCCH. That is, the base station 10 can perform scheduling by taking into account an actual PSFCH timing that is not usually recognized by the base station 10. Furthermore, even if the offset between a Uu carrier and an SL carrier is large, the base station 10 can perform scheduling by taking into account the processing time at the terminal 20.

Also, the PSFCH processing time may be defined as any value of 1) to 4) below.

1) The same value as the PDSCH processing time.

That is, the same period as the period from PDSCH reception to HARQ feedback transmission, may be configured for the PSFCH processing time. As a result, the time required at the terminal 20 from reception to HARQ feedback, can be reused.

2) The same value set as the period from SPS (Semi-Persistent Scheduling)-PDSCH release to HARQ feedback. That is, the same period as the period from an SPS-PDSCH release indication via PDCCH to HARQ feedback transmission, may be configured for the PSFCH processing time. For example, in UE processing capability 1, the number of symbols N may be equal to 10 for SCS (Subcarrier Spacing) =15 kHz, the number of symbols N may be equal to 12 for SCS=30 kHz, the number of symbols N may be equal to 22 for SCS=60 kHz, and the number of symbols N may be equal to 25 for SCS=120 kHz. Also, for example, in UE processing capability 2, the number of symbols N may be equal to 5 for SCS=15 kHz, the number of symbols N may be equal to 5.5 for SCS=30 kHz, and the number of symbols N may be equal to 11 for SCS=60 kHz. These values are the time from control information reception to HARQ feedback, and can be configured to smaller values that the terminal 20 can implement.

3) The same value set as the PUSCH preparation time. That is, the time from an UL grant to PUSCH transmission, may be configured for the PSFCH processing time. As a result, the time required at the terminal 20 from control information reception to transmission, can be reused.

4) New value or value set. It may be defined as a shorter time than the above 1), 2) and 3). As a result, it can be avoided to unnecessarily enlarge the processing time for a simple operation at the terminal 20.

Note that the PSFCH processing time may be the time required for processing the PSFCH and/or preparing the UL feedback channel.

Note that if multiple SL-HARQ-ACKs are multiplexed into a single UL feedback channel, the PSFCH reception occasion corresponding to the PSFCH processing time, may be the last PSFCH reception occasion with respect to the time direction.

Note that the UL feedback channel may be a PUCCH or a PUSCH.

According to the above-stated embodiments, the transmission and reception timings of a PUCCH for transmitting a sidelink HARQ response can be clarified between the base station 10 and the terminal 20.

That is, the timing of uplink transmission of a HARQ (Hybrid Automatic Repeat Request) response in inter-terminal direct communication can be indicated by the base station as a value in which the terminal's processing time is taken into account.

(Device Arrangement)

Next, examples of functional arrangement of the base station 10 and the terminal 20 that perform operations and actions as stated above are described. The base station 10 and the terminal 20 include functions of implementing the above-stated embodiments. Note that the base station 10 and the terminal 20 each may have only a portion of the functions of the embodiments.

<Base Station 10>

Figure 18:
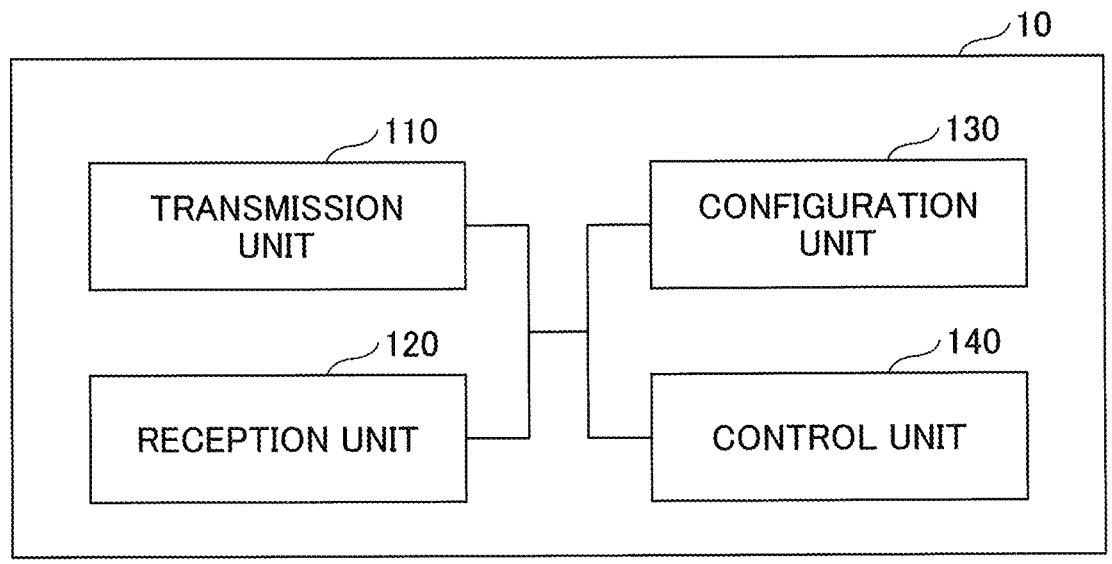
FIG. 18 is a diagram illustrating an example of functional arrangement of a base station 10 according to an embodiment of the present invention.

FIG. 18 illustrates an example of functional arrangement of the base station 10. As shown in FIG. 18, the base station 10 includes a transmission unit 110, a reception unit 120, a configuration unit 130 and a control unit 140. The functional arrangement shown in FIG. 18 is only one example. The functional separation and the names of the functional units may be arbitrary as long as operations according to the present embodiment can be achieved.

The transmission unit 110 includes a function of generating a signal for transmission to the side of the terminal 20 and wirelessly transmitting the signal. The reception unit 120 includes a function of receiving various signals transmitted from the terminal 20 and acquiring information for upper layers from the received signals, for example. Also, the transmission unit 110 includes a function of transmitting an NR-PSS, an NR-SSS, an NR-PBCH, a DL/UL control signal, a DL reference signal or the like to the terminal 20.

The configuration unit 130 stores preconfigured configurations and various configurations for transmission to the terminal 20 in a memory device and reads them from the memory device as needed. Contents of the configurations may be information associated with configurations of D2D information or the like, for example.

The control unit 140 performs operations associated with configurations for the terminal 20 to perform D2D communication as stated in conjunction with the embodiments. Also, the control unit 140 transmits a scheduling for D2D communication and DL communication to the terminal 20 via the transmission unit 110. Also, the control unit 140 receives information associated with an HARQ acknowledgement for D2D communication and DL communication from the terminal 20 via the reception unit 120. The functional portions of the control unit 140 related to signal transmission may be included in the transmission unit 110, and the functional portions of the control unit 140 related to signal reception may be included in the reception unit 120.

<Terminal 20>

Figure 19:
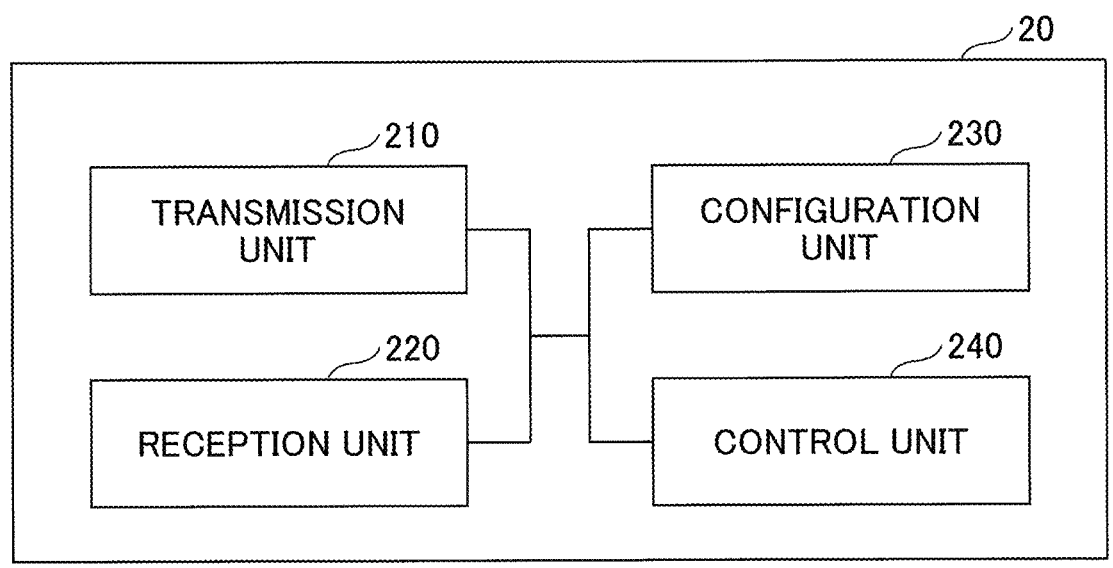
FIG. 19 is a diagram illustrating an example of functional arrangement of a terminal 20 according to an embodiment of the present invention.

FIG. 19 is a diagram illustrating an example of functional arrangement of the terminal 20 according to an embodiment of the present invention. As illustrated in FIG. 19, the terminal 20 has a transmission unit 210, a reception unit 220, a configuration unit 230 and a control unit 240. The functional arrangement shown in FIG. 19 is only one example. The functional separation and the names of the functional units may be arbitrary as long as operations according to the present embodiment can be achieved.

The transmission unit 210 generates a transmission signal from transmission data and wirelessly transmits the transmission signal. The reception unit 220 wirelessly receives various signals and acquires signals for upper layers from the received physical layer signals. Also, the reception unit 220 has a function of receiving an NR-PSS, an NR-SSS, an NR-PBCH, a DL/UL/SL control signal or a reference signal and so on transmitted from the base station 10. Also, for example, as D2D communication, the transmission unit 210 transmits a PSCCH (Physical Sidelink Control Channel), a PSSCH (Physical Sidelink Shared Channel), a PSDCH (Physical Sidelink Discovery Channel), a PSBCH (Physical Sidelink Broadcast Channel) or the like to other terminals 20, and the reception unit 220 receives the PSCCH, the PSSCH, the PSDCH, the PSBCH or the like from other terminals 20.

The configuration unit 230 stores various configurations received at the reception unit 220 from the base station 10 or the terminal 20 in a memory device and reads them from the memory device as needed. Also, the configuration unit 230 stores preconfigured configurations. Contents of the configurations may be information associated with configuration of D2D communication and so on, for example.

The control unit 240 controls D2D communication to other terminals 20 as stated above in conjunction with the embodiments. Also, the control unit 240 performs operations associated with an HARQ for D2D communication and DL communication. Also, the control unit 240 transmits information associated with an HARQ acknowledgement for D2D communication and DL communication to other terminal 20 scheduled from the base station 10 to the base station 10. Also, the control unit 240 may perform scheduling for D2D communication for other terminals 20. Also, the control unit 240 may autonomously select a resource for use in D2D communication from a resource selection window. Also, the control unit 240 performs operations associated with a MCS in transmission and reception of D2D communication. The functional portion of the control unit 240 regarding signal transmission may be included in the transmission unit 210, and the functional portion of the control unit 240 regarding signal reception may be included in the reception unit 220.

(Hardware Arrangement)

The block diagrams (FIGS. 18 and 19) used for the description of the above embodiments show blocks of functional units. These functional blocks (components) are implemented by any combination of at least one of hardware and software. In addition, the implementation method of each function block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices. The functional block may be implemented by combining software with the above-described one device or the above-described plurality of devices.

Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, etc. For example, a functional block (component) that functions to transmit is called a transmitting unit or a transmitter. In either case, as described above, the implementation method is not particularly limited.

Figure 20:
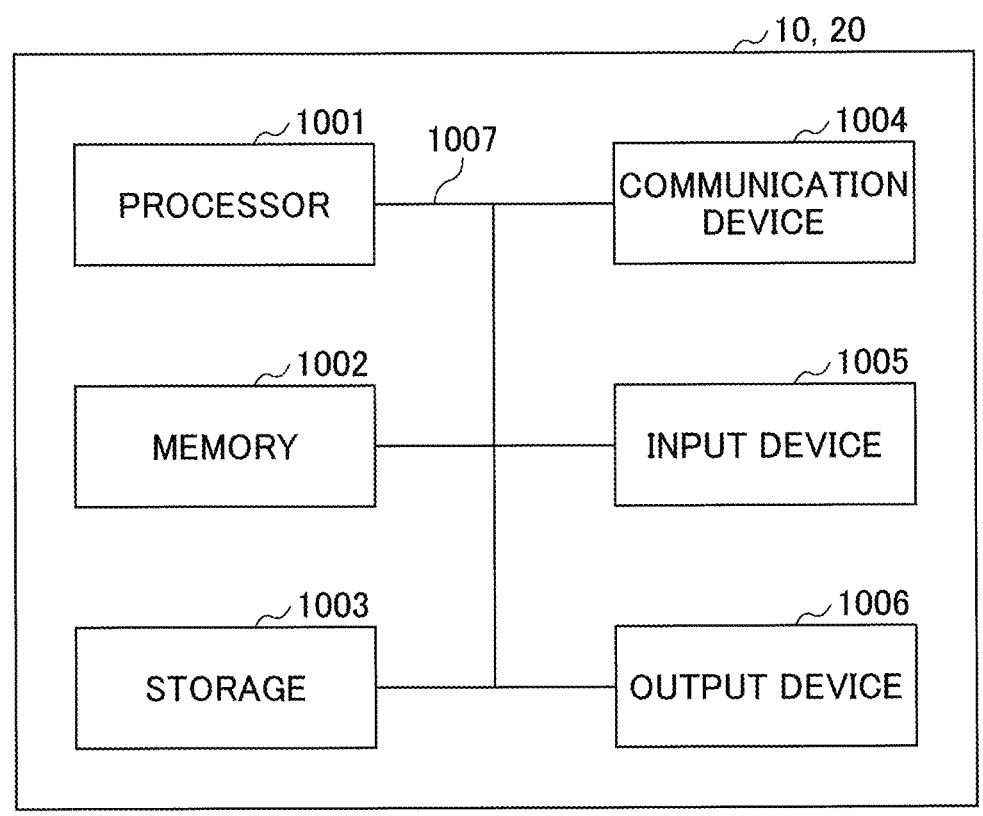
FIG. 20 is a diagram illustrating an example of hardware arrangement of the base station 10 or the terminal 20 according to an embodiment of the present invention.

For example, each of the base station 10, the terminal 20 and so on according to one embodiment of the present invention may function as a computer performing operations for a radio communication method according to the present disclosure. FIG. 20 is a diagram illustrating an example of a hardware configuration of the base station 10 and the terminal 20 according to one embodiment of the present disclosure. The base station 10 and the terminal 20 as stated above may be physically configured as a computer device including a processor 1001, a memory 1002, a storage 1003, a communication device 1004, an input device 1005, an output device 1006, a bus 1007, etc.

In the following description, the term "device" can be read as a circuit, a device, a unit, etc. The hardware configuration of the base station 10 and the terminal 20 may be configured to include one or more of the respective devices shown in the figure, or may be configured without some devices.

Each function of the base station 10 and the terminal 20 is implemented by loading predetermined software (program) on hardware, such as the processor 1001 and the memory 1002, so that the processor 1001 performs computation and controls communication by the communication device 1004, and at least one of reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, etc. For example, the above-stated control units 140 and 240 or the like may be implemented with the processor 1001.

Additionally, the processor 1001 reads a program (program code), a software module, data, etc., from at least one of the storage 1003 and the communication device 1004 to the memory 1002, and executes various processes according to these. As the program, a program is used which causes a computer to execute at least a part of the operations described in the above-described embodiment. For example, the control unit 140 of the base station 10 shown in FIG. 18 may be implemented by a control program that is stored in the memory 1002 and that is operated by the processor 1001. Also, for example, the control unit 240 of the terminal 20 shown in FIG. 19 may be implemented by a control program that is stored in the memory 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a ROM (Read Only Memory), an EPROM (Erasable Programmable ROM), an EEPROM (Electrically Erasable Programmable ROM), a RAM (Random Access Memory), etc. The memory 1002 may be referred to as a register, a cache, a main memory (main storage device), etc. The memory 1002 may store a program (program code), a software module, etc., which can be executed for implementing the radio communication method according to one embodiment of the present disclosure.

The storage 1003 is a computer readable storage medium and may be formed of, for example, at least one of an optical disk, such as a CD-ROM (Compact Disc ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, a magnetic strip, etc. The storage 1003 may be referred to as an auxiliary storage device. The above-described storage medium may be, for example, a database including at least one of the memory 1002 and the storage 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, etc. The communication device 1004 may be configured to include, for example, a high frequency switch, a duplexer, a filter, a frequency synthesizer, etc., to implement at least one of frequency division duplex (FDD: Frequency Division Duplex) and time division duplex (TDD: Time Division Duplex). For example, a transceiver antenna, an amplification unit, a transceiver unit, a channel interface or the like may be implemented with the communication device 1004. The transceiver unit may have an implementation with the transmission unit and the reception unit that are physically or logically separated.

The input device 1005 is an input device (e.g., a keyboard, a mouse, a microphone, a switch, a button, a sensor, etc.) that receives an external input. The output device 1006 is an output device (e.g., a display, speaker, LED lamp, etc.) that performs output toward outside. The input device 1005 and the output device 1006 may be configured to be integrated (e.g., a touch panel).

Each device, such as processor 1001 and memory 1002, is also connected by the bus 1007 for communicating information. The bus 1007 may be formed of a single bus or may be formed of different buses between devices.

Also, the base station 10 and the terminal 20 may include hardware, such as a microprocessor, a digital signal processor (DSP: Digital Signal Processor), an ASIC (Application Specific Integrated Circuit), a PLD (Programmable Logic Device), and a FPGA (Field Programmable Gate Array), which may implement some or all of each functional block. For example, the processor 1001 may be implemented using at least one of these hardware components.

(Conclusion of the Embodiments)

As stated above, according to an embodiment of the present invention, there is provided a terminal, comprising: a reception unit that receives a response associated with retransmission control from another terminal via a first channel; a transmission unit that transmits the response associated with retransmission control to a base station via a second channel; and a control unit that determines a timing of transmitting the second channel based on a predetermined time configured between the first channel and the second channel.

According to the above arrangement, the transmission and reception timing of a PUCCH for transmitting an HARQ response for sidelink can be clarified. That is, the uplink transmission timing of the HARQ response in inter-terminal direct communication, can be indicated by a base station as a value in which a terminal's processing time is taken into account.

The control unit may determine the timing of transmitting the second channel based on the predetermined time starting from a timing of the first channel. According to this arrangement, the transmission and reception timing of a PUCCH for transmitting the HARQ response for sidelink can be clarified.

The control unit may determine the timing of transmitting the second channel based on the predetermined time starting from a time point obtained by adding a predetermined offset to the timing of the first channel. According to the arrangement, the transmission and reception timing of a PUCCH for transmitting the HARQ response for sidelink between the base station 10 and the terminal 20, can be clarified.

The predetermined offset may be determined based on a timing difference between a carrier for receiving the first channel and a carrier for transmitting the second channel. According to the arrangement, the transmission and reception timing of a PUCCH for transmitting the HARQ response for sidelink between the base station 10 and the terminal 20, can be clarified.

The control unit may determine the timing of transmitting the second channel based on the predetermined time that is the same as a time from an SPS (Semi-Persistent Scheduling) physical shared channel release indication to a response associated with retransmission control. According to the arrangement, the transmission and reception timing of a PUCCH for transmitting the HARQ response for sidelink between the base station 10 and the terminal 20, can be clarified.

Also, according to an embodiment of the present invention, there is provided a communication method implemented by a terminal, comprising: a reception procedure that receives a response associated with retransmission control from another terminal via a first channel; a transmission procedure that transmits the response associated with retransmission control to a base station via a second channel; and a control procedure that determines a timing of transmitting the second channel based on a predetermined time configured between the first channel and the second channel.

According to the above arrangement, the transmission and reception timing of a PUCCH for transmitting an HARQ response for sidelink can be clarified. That is, the uplink transmission timing of the HARQ response in inter-terminal direct communication, can be indicated by a base station as a value in which a terminal's processing time is taken into account.

Supplemental Embodiments

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station 10 and the terminal 20 have been described with the use of the functional block diagrams, but these apparatuses may be implemented by hardware, software, or a combination thereof. Each of software functioning with a processor of the base station apparatus 10 according to the embodiment of the present invention and software functioning with a processor of the user equipment 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (a MIB (Master Information Block) and a SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also, a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station 10 described in the present disclosure may in some cases be performed by an upper node. It is clear that, in a network that includes one or more network nodes including the base station 10, various operations performed for communication with the terminal 20 can be performed by at least one of the base station 10 and another network node other than the base station 10 (for example, a MME, a S-GW, or the like may be mentioned, but not limited thereto). In the above, the description has been made for the case where another network node other than the base station 10 is a single node as an example. However, the other network node may be a combination of a plurality of other network nodes (for example, an MME and a S-GW).

Information, signals, or the like described in the present disclosure may be output from an upper layer (or a lower layer) to a lower layer (or an upper layer). Information, signals, or the like described in the present disclosure may be input and output via a plurality of network nodes.

Information or the like that has been input or output may be stored at a predetermined location (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Also, software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Also, information, parameters, and the like described in the present disclosure may be expressed by absolute values, may be expressed by relative values with respect to predetermined values, and may be expressed by corresponding different information. For example, radio resources may be indicated by indices.

The above-described names used for the parameters are not restrictive in any respect. In addition, formulas or the like using these parameters may be different from those explicitly disclosed in the present disclosure. Various channels (for example, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells. In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication device, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Things) device such as a sensor.

In addition, a base station according to the present disclosure may be read as a user terminal. For example, each aspect or embodiment of the present disclosure may be applied to a configuration in which communication between a base station and a user terminal is replaced by communication between a plurality of user equipments 20 (that may be called D2D (Device-to-Device), V2X (Vehicle-to-Everything), or the like). In this case, a user equipment 20 may have above-described functions of the base station apparatus 10. In this regard, a word such as "up" or "down" may be replaced with a word corresponding to communication between terminals (for example, "side"). For example, an uplink channel, a downlink channel, or the like may be replaced with a side channel.

Similarly, a user terminal according to the present disclosure may be read as a base station. In this case, a base station may have above-described functions of the user terminal.

The term "determining" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "Determining" may be read as "assuming", "expecting", "considering", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements.

These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above-described apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of numerology.

The numerology may be a communication parameter that is applied to at least one of transmission and reception of a signal or a channel. The numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in a frequency domain, a specific windowing processing performed by a transceiver in a time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on the numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit for transmitting a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the conventional LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each user equipment 20 to assign, in TTI units, radio resources (such as frequency bandwidths, transmission power, and the like that can be used by each user equipment 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel. 8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, a normal TTI, a subframe, and the like) may be read as TTI having a time length exceeding 1 ms, and a short TTI (for example, a shortened TTI) may be read as a TTI having a TTI length less than the TTI length of the long TTI and equal to or more than 1 ms.

A resource block (RB) is a resource assignment unit in terms of a time domain and a frequency domain and may include one or a plurality of consecutive subcarriers in terms of frequency domain. The number of subcarriers included in an RB may be the same regardless of the numerology, and, for example, may be 12. The number of subcarriers included in a RB may be determined based on the numerology.

Also, in terms of the time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

Also, a resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for certain numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of configured BWPs may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following the article is of a plural form.

Throughout the present disclosure, an expression that "A and B are different" may mean that "A and B are different from each other". Also, this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

UL transmission of an SL-HARQ-ACK of the present disclosure is one example of the first transmission. Other UL transmissions are one example of the second transmission. The parameter X is one example of the first parameter. The parameter Y is one example of the second parameter. The DCI is one example of downlink control information.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

LIST OF REFERENCE SYMBOLS

10 Base station
110 Transmission unit
120 Reception unit
130 Configuration unit
140 Control unit
20 Terminal 210 Transmission unit
220 Reception unit
230 Configuration unit
240 Control unit
1001 Processor
1002 Memory
1003 Storage
1004 Communication device
1005 Input device
1006 Output device

The invention claimed is:

1. A terminal, comprising:
a receiver that receives a Physical Sidelink Feedback Channel (PSFCH) including response information related to a first retransmission control from another terminal; and
a transmitter that transmits an uplink channel including response information related to a second retransmission control based on the response information related to the first retransmission control to a base station, wherein
the transmitter does not transmit the uplink channel including the response information related to the second retransmission control until a first time, that depends on subcarrier spacing, elapses from a reception occasion of the PSFCH of direct communication between terminal, and
the first time is shorter than a second time that is time from reception of an uplink (UL) grant until transmission of an uplink shared channel corresponding to the UL grant.

2. The terminal as claimed in claim 1, wherein the uplink channel is a physical uplink shared channel or a physical uplink control channel.

3. A communication method of a terminal, the communication method comprising:
receiving a Physical Sidelink Feedback Channel (PSFCH) including response information related to a first retransmission control from another terminal; and
transmitting an uplink channel including response information related to a second retransmission control based on the response information related to the first retransmission control to a base station, wherein
the transmitting includes not transmitting the uplink channel including the response information related to the second retransmission control until a first time, that depends on subcarrier spacing, elapses from a reception occasion of the PSFCH of direct communication between terminal, and
the first time is shorter than a second time that is time from reception of an uplink (UL) grant until transmission of an uplink shared channel corresponding to the UL grant.

4. A communication system comprising: a terminal; and a base station, wherein
the terminal includes:
a receiver that receives a Physical Sidelink Feedback Channel (PSFCH) including response information related to a first retransmission control from another terminal; and
a transmitter that transmits an uplink channel including response information related to a second retransmission control based on the response information related to the first retransmission control to the base station, wherein
the transmitter does not transmit the uplink channel including the response information related to the second retransmission control until a first time, that depends on subcarrier spacing, elapses from a reception occasion of the PSFCH of direct communication between terminal, and
the first time is shorter than a second time that is time from reception of an uplink (UL) grant until transmission of an uplink shared channel corresponding to the UL grant, and
the base station includes
a receiver that receives the uplink channel from the terminal.

* * * * *